United States Patent
Sweeney, Jr.

(10) Patent No.: US 6,524,433 B2
(45) Date of Patent: Feb. 25, 2003

(54) SELF-DISPENSING FASTENER FOR PHOTOCURING ADHESIVE

(76) Inventor: Theodore J. Sweeney, Jr., 317 Belanger Ave., Grosse Pointe Farms, MI (US) 48236

( * ) Notice: Subject to any disclaimer, the term of this patent is extended or adjusted under 35 U.S.C. 154(b) by 0 days.

(21) Appl. No.: 09/998,144

(22) Filed: Nov. 30, 2001

(65) Prior Publication Data

US 2002/0092601 A1 Jul. 18, 2002

Related U.S. Application Data

(63) Continuation-in-part of application No. 09/585,504, filed on Jun. 1, 2000, now abandoned, which is a continuation of application No. 09/075,583, filed on May 11, 1998, now abandoned.

(51) Int. Cl.$^7$ .............................. B32B 31/28; B60J 1/02
(52) U.S. Cl. ................. 156/379.6; 156/108; 156/275.5; 156/275.7; 156/379.8; 156/380.9; 156/381; 269/58; 269/287; 269/329; 411/82.2

(58) Field of Search ....................... 156/91, 108, 272.2, 156/273.7, 275.3, 275.5, 275.7, 379.6, 279.8, 381, 380.9; 269/58, 287, 329; 411/82, 82.2, 258

(56) References Cited

U.S. PATENT DOCUMENTS

| | | |
|---|---|---|
| 5,044,852 A | 9/1991 | Sweeney et al. |
| 5,277,530 A | 1/1994 | Sweeney, Sr. et al. |

*Primary Examiner*—Sam Chuan Yao
(74) *Attorney, Agent, or Firm*—Brooks & Kushman P.C.

(57) ABSTRACT

A self-dispensing fastener for attachment to a substrate by a quick-setting photocuring adhesive has a UV transparent flange for placement against the substrate and UV opaque adhesive reservoir for containing the adhesive in the fastener, and upon pressing the fastener against the substrate the adhesive is expelled into the interface formed between the flange and the substrate for curing by UV radiation.

8 Claims, 4 Drawing Sheets

SELF-DISPENSING FASTENER FOR PHOTOCURING ADHESIVE

CROSS-REFERENCE TO RELATED APPLICATIONS

This application is a continuation-in-part of U.S. application Ser. No. 09/585,504 filed Jun. 1, 2000 now abandoned, which is a continuation of U.S. application Ser. No. 09/075,583 filed May 11, 1998, now abandoned,

BACKGROUND OF THE INVENTION

1. Field of the Invention

This invention relates to adhesively secured fasteners utilizing quick-setting, photocuring adhesives.

2. Background Art

U.S. Pat. Nos. B1 5,044,853 and 5,277,530 show a fastener for quick attachment to a substrate. The fastener is simply depressed against the substrate and a quick-setting adhesive is dispensed into the interface between the fastener and the substrate thereby attaching the fastener. Anaerobic and several other adhesives may be used quite satisfactorily with such fasteners.

However, there are some situations where it has become desirable to utilize a photocuring adhesive rather than those previously used. As used herein, a photosensitive adhesive is one which cures upon exposure to radiation in the visible and ultraviolet light spectrums.

Utilizing photocuring adhesives requires that the adhesive be effectively shielded from the curing radiation, otherwise the adhesive will cure prematurely in the fastener rendering the fastener useless. At the same time, when the fastener is pressed against the substrate to which it is to be secured, it must be possible to illuminate the adhesive at the interface between the fastener and the substrate to cure it. As used herein, the term "illuminate" includes radiation in the visible and UV spectrums.

SUMMARY OF THE INVENTION

I have discovered approaches which render use of a photocuring adhesive feasible in fasteners of the general type shown in the aforesaid patents. In one embodiment, the adhesive is stored in a reservoir made of UV opaque material which is placed in a UV transparent fastener such that upon expelling the adhesive into an interface between the fastener and the substrate to which the fastener is to be secured, UV light can contact the adhesive in such interface to effect the cure.

In another embodiment the fastener has a UV opaque chamber in which the adhesive is stored, and the portion which forms an interface with the substrate is sufficiently transparent to UV radiation that adhesive expelled into the interface from such chamber can be cured. In still another embodiment, the fastener is opaque to the UV spectrum, but is used on UV transparent substrates, such as glass or clear plastic, such that UV radiation may reach the photocuring adhesive in the interface between the fastener and the substrate by having the light pass through the substrate beneath the fastener.

In another embodiment, the adhesive reservoir and plunger are made of a material which is opaque to UV radiation but at least one of them is transparent to visible light, whereby the reservoir when filled with adhesive and stopped with a plunger may be visually inspected to determine whether it contains adhesive. Other embodiments which may be combinations of the aforesaid will become apparent as this description proceeds.

I have also discovered that adhesion of the fastener to the frit-covered margin of a vehicle window may be improved by coating such margin with a primer. Several primers useful for this purpose are described herein.

Apparatus for affixing self-dispensing UV curable adhesive fasteners on windows to be installed in automotive vehicle bodies is also disclosed. Such apparatus includes applicators for holding the fasteners and pressing them against the window and a light source in each applicator which will direct light through a transparent flange of the fastener to cure UV curable adhesive disposed between the flange and the window. The apparatus also includes a fixture for holding the window in a determined position relative to the applicator so that the fasteners held by the applicators will be affixed to the window in predetermined locations. The applicators may be so constructed and arranged that the UV radiation will be shielded from the eyes of personnel working at the fastener applying apparatus.

DETAILED DESCRIPTION OF THE PREFERRED EMBODIMENT(S)

While my invention is usable for fixing a fastener or other part to any substrate utilizing a photocuring adhesive, I have disclosed it here in connection with fasteners used to locate and hold window glass in place in a vehicle body as it passes down the assembly line during construction of the motor vehicle.

In many instances, the windows of motor vehicles are held in place utilizing a construction adhesive which requires several hours to cure. Because the windows are installed in the body while it is still on the assembly line and subject to vibration and jostling, means must be provided to locate and hold the windows in place and prevent unwanted shifting thereof in the window opening while assembly of the vehicle continues and before the construction adhesive has fully cured. Various expedients have been used in the past with varying success, but there has remained the need for a locating and holding device (or fastener) which is both easy to use and inexpensive.

Referring to the fasteners disclosed in the aforesaid patents, it was thought such a fastener could be attached to the window glass and adapted to cooperate with the vehicle body to hold the glass in place. However, in some instances, automobile manufacturers were not satisfied with the bonding strength of prior adhesives to secure the fasteners to the window glass. It was discovered that the quick-setting adhesives heretofore used in such fasteners did not hold quite as well on windows painted with an opaque frit at the marginal edges to hide the construction adhesive. While the construction adhesive adhered sufficiently to the frit coating, the quick-setting adhesive of the fasteners did not adhere sufficiently to satisfy all the vehicle manufacturers.

A quick-setting adhesive I have discovered that will satisfy the vehicle manufacturers who disliked the bonding strength of the prior adhesives to the frit coated surface of the windows, is a photocuring adhesive. Such adhesive exists which may be cured rapidly, i.e., in but a few seconds, utilizing visible light or ultraviolet light. However, the opaque frit on the marginal edge of the window sufficiently blocks the radiation that it cannot penetrate through to the adhesive to effect a quick cure. In fact, the fasteners themselves have been heretofore made of an opaque plastic material that, similar to the frit, prevents illumination reaching the adhesive. If photocuring adhesive is stored in fasteners which are not opaque, it must be shielded from illumination otherwise the adhesive will cure in the fastener rendering them useless.

Figure 2:
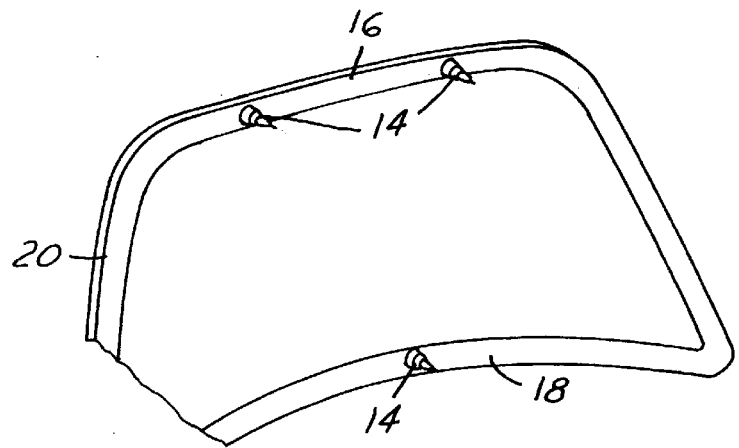
FIG. 2 is a fragmentary perspective view of a motor vehicle window showing my improved fasteners adhered thereto.

In the drawings, I show the rear portion of a motor vehicle 10 having a rear light (or window) 12 installed therein and located by fasteners 14. The fasteners are disposed in spaced relation at the marginal edge of the rear light as shown in FIG. 2—two being adjacent the top edge 16, and one adjacent the bottom 18. Because the glass is held in the window opening by a construction adhesive (not shown) which takes some time to cure, the fasteners hold the glass in place during such curing. An opaque frit layer 20 overlies the marginal edge of the glass to hide the construction adhesive and thereby improve the aesthetic appearance of the installed glass. The frit layer 20 is sufficiently opaque to illumination that rapid cure of a photocuring adhesive by exposing the backside of the glass to illumination is ineffective.

Figure 3:
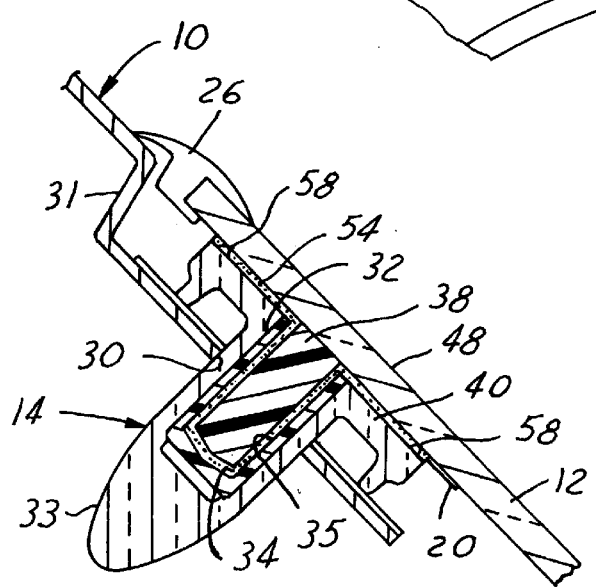
FIG. 3 is a cross-sectional view taken on the line 3—3 of FIG. 2.
Figure 4:
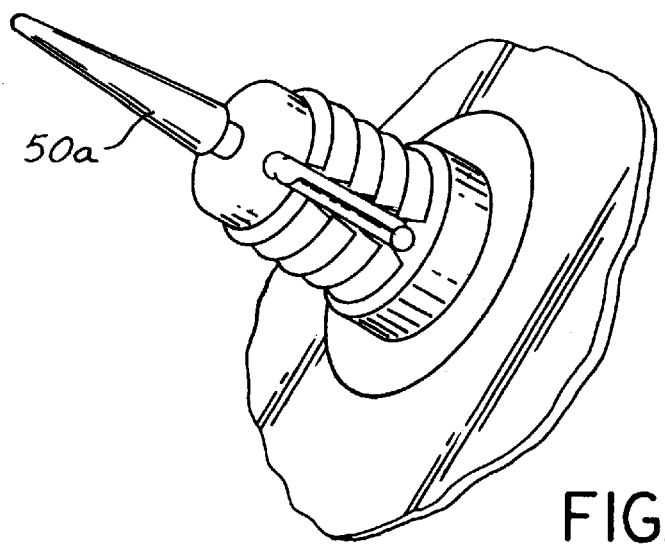
FIG. 4 is a perspective view of another embodiment of the invention.

Referring now to FIGS. 2 and 3 as well as FIG. 4 of U.S. Pat. No. 5,277,530, which patent is incorporated herein by reference, and with respect to which I have used, where convenient, corresponding reference numerals, I provide a fastener, having a body 32, with an integral flange 40 at one end and a tapered locating nose 33 at the opposite end. The body 32 is generally elongated and interiorly provided with an adhesive storage cavity 35 similar to the arrangement shown in U.S. Pat. No. 5,277,530. In the preferred embodiment, an adhesive reservoir 34 is received in the cavity 35. The reservoir contains a supply of adhesive 32 which is expelled therefrom by a piston or plunger 38 as the fastener is pressed against the glass 12, and extruded into the interface 54 formed between the flange 40 and the glass 12. The details of the reservoir and plunger design, and the operation thereof is fully recited in U.S. Pat. No. 5,277,530 and need not be repeated here.

Figure 1:
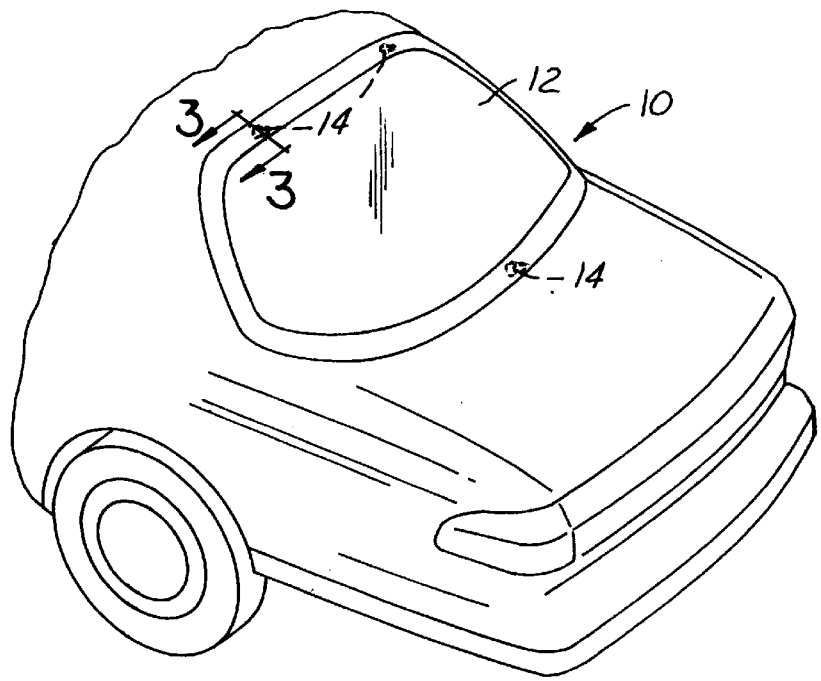
FIG. 1 is a perspective view of the rear portion of a motor vehicle utilizing my invention to hold the rear window in the vehicle body during assembly of the vehicle.

Suffice it that, to deploy the fastener and adhere it to the glass, it is positioned as desired on the window, such as in the positions shown in FIGS. 1 and 2, and then with the plunger 38 positioned against the glass, the fastener is urged against the glass to depress the plunger to expel the adhesive into the interface as at 54. At this point, curing of the adhesive is required.

After the adhesive 32 has cured, the nose 33 is received in an opening or locating device 30 in the body panel 31 around the window opening. Construction adhesive, not shown, will lie in the space between the body panel 31 and the glass 12 in engagement with the frit layer 20. In this way, the fastener holds the window in place while the construction adhesive cures. A trim strip 26 received over the edge of the glass overlies the body 10 and bridges the gap between the glass and the body.

Because a photocuring adhesive is used in the fastener, once the adhesive is extruded into the interface as at 54, the adhesive must be exposed to illumination such as ultraviolet light to cure it. Because the frit layer 20 is too opaque to allow UV radiation therethrough, the adhesive cannot be cured quickly by directing a UV light against the exposed face 48 of the glass. Accordingly, I propose that the fastener body 32 and more specifically the flange 40 be molded of a plastic material sufficiently transparent to ultraviolet light that the adhesive at 54 cures quickly. In practice, the entire fastener may be transparent to UV radiation.

One such plastic material is sold by BASF under the trademark TURLOX. This is a clear ABS plastic which will allow UV radiation to penetrate the flange 40 to substantially instantly cure the adhesive. Other plastics compatible with the photocuring adhesive may also be used.

I have found that a suitable photocuring adhesive is sold under the trademark DYMAX by Dymax Corporation of 51 Greenwoods Rd., Torrington, Conn. 06790. This is a polyurethane Oligomer Mixture, sold under the product identification 3-3094. Other adhesives may be used which are sufficiently strong and meet the other requirements of the application.

Once the adhesive has been dispersed into the interface beneath the flange 40, an ultraviolet light is directed toward the fastener, and such radiation will pass through the flange and instantly cure the adhesive. I have found that this adhesive adheres well to the frit coating on the automotive glass.

To prevent the adhesive from curing while stored in the reservoir in the fastener body before being extruded, the reservoir 34 and the plunger 38 should be made of materials sufficiently opaque to illumination that the adhesive will not cure for long periods. In many, if not most applications, utilizing UV opaque reservoirs and plungers, with UV transparent fastener bodies may be the most cost effective approach to use.

It is possible to form the reservoir 34 and plunger 38 of a clear plastic (one transparent to visible light) but opaque to ultraviolet light. For example, an additive identified as Ashland UV81 sold by Ashland Chemical Company may be added to clear polyethylene or polypropylene to render the same sufficiently opaque to UV radiation as to be satisfactory for use in molding the reservoir and plunger. An advantage of a reservoir and plunger which may be transparent to visible light but opaque to UV radiation is to enable visual inspection of reservoir/plunger combinations to verify that there is photocuring adhesive in the reservoir.

Instead of forming both the reservoir and plunger of material opaque to UV radiation but transparent to visible light, only one of the two may be transparent to visible light. For example, the plunger may be transparent to visible light and determining whether the reservoir is properly filled may be visually determined by inspection through the plunger. Or the reverse arrangement may be utilized and inspection conducted through the wall of the reservoir.

There may be instances where it is desirable to use a material for the reservoir which is not opaque to UV radiation. In such instance the body 32 of the fastener must be opaque to the UV radiation but the flange nevertheless transparent thereto. In such cases the outer or inner surfaces of the body 32 may be coated with a paint that is opaque or the locator may be made by a two-shot molding technique where the body 32 is molded of a UV opaque resin and the flange 40 of a UV transparent resin.

In those instances where the fastener is to be applied to UV transparent substrates, of course the fastener body, flange 40 and plunger 38 may be opaque, and the UV radiation may be directed against the opposite side of the substrate.

Figure 5A:
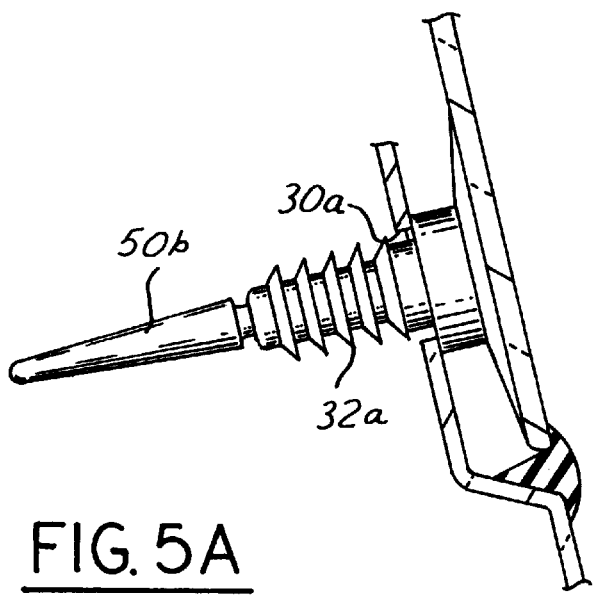
FIG. 5A is a cross-sectional view through the fastener of FIG. 4.
Figure 5B:
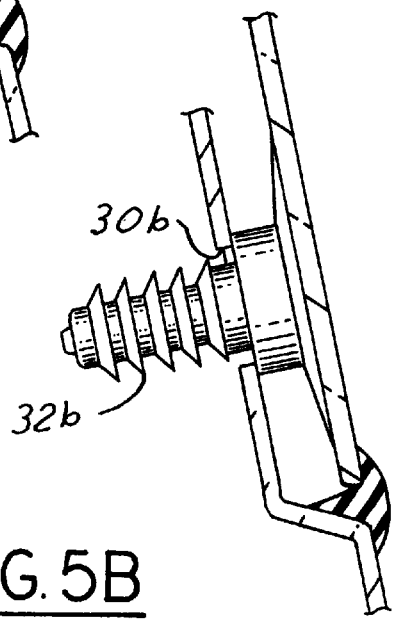
FIG. 5B is a cross-sectional view through the fastener of FIG. 4 after the nose portion of the fastener has been broken off.

In FIGS. 4, 5A and 5B somewhat different fasteners are shown though they work on exactly the same basis as that previously described. These fasteners are of a so-called Christmas tree design wherein the fastener is pushed through a hole 30a or 30b that is slightly smaller in diameter than the barbs on post 32a or 32b. These fasteners allow for adjustment in the distance they may be pressed through the holes 30 and 30b and still hold the fastener in the hole. Because it may be difficult to find the holes 30a or 30b when positioning the window in the window opening, these fasteners have a long guide stem 50a or 50b which may more easily enter the holes to guide the fastener thereinto. After the fastener is in place, the stem may be broken off as shown in FIG. 5b. Interiorly, these fasteners will have reservoirs and plungers, and the bodies and flanges will be made of the types of materials and of an opaqueness as previously described. Obviously, other materials may be utilized for the fasteners, and for that matter also for the photocuring adhesive than that specified herein as long as the materials will yield the results as above described.

While I have shown the quick-setting, photocuring adhesive being stored in a separate reservoir with a piston, both made of UV opaque plastic, and the flange 40 being UV transparent, it is to be understood that the adhesive may be stored directly in a cavity, serving as a reservoir, in the fastener body without the use of a separate reservoir, provided measures are taken to prevent UV light from reaching the adhesive. To this end, the body surrounding the adhesive may be painted with a UV opaque coating or the material of the body may be opaque while the flange 40 is UV transparent. As mentioned, this may require manufacture of the body members using a two-shot molding technique. Other variations or combinations of UV opaque and transparent materials may suggest themselves to those skilled in this art in view of the foregoing description.

While I have shown the fastener simply as a device with a tapered locating nose, the fastener may be shaped to provide a wide variety of fastening or locating designs.

For curing the quick-setting photocuring adhesive, sunlight, or artificial light may be used provided the appropriate band of the spectrum is included.

With the use of photocuring adhesives, it may be desirable to provide a thicker layer of adhesive at the interface between the flange 40 and the substrate (glass, etc.). To accomplish this, the surface of the flange 40 opposed to the substrate may be provided with raised portions such as small dimples 58 scattered over its surface of predetermined height which will space the flange 40 from the glass a determined distance to provide an adhesive thickness as desired. Instead of dimples, channels may be used as suggested in U.S. Pat. No. B1 5,044,852 and 5,277,520. Alternatively, radiating ribs could be used.

Figure 8:
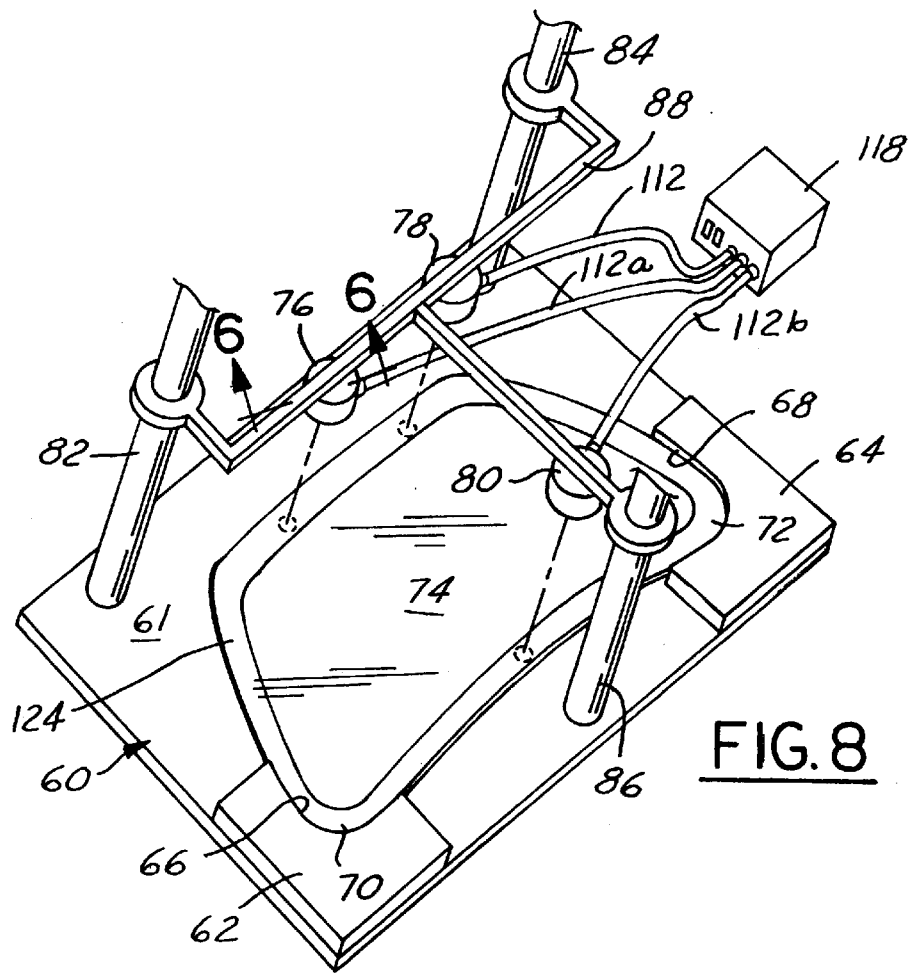
FIG. 8 shows an apparatus and fixture for orienting a window in relation to the applicators for applying fasteners thereto.

In FIG. 8, we have shown apparatus for affixing self-dispensing UV-curable adhesive fasteners to a substrate, more specifically to a window to be installed in an automotive vehicle body. The fasteners, as previously described, are received in locators in the vehicle body and position and hold the window while construction adhesive between the window and vehicle body cures. This prevents the window from shifting and breaking loose from the construction adhesive during assembly of the vehicle body on an assembly line in an automotive assembly plant. The apparatus as shown in FIG. 8 includes a jig 60 comprising a table 61 on which are locating blocks 62 and 64 provided with contoured cutouts 66 and 68 adapted to receive the corners 70 and 72 of a window 74 which is to be mounted in an automotive vehicle body. The blocks 62 and 64 will accurately locate the window on the table 61.

Applicators 76, 78 and 80 are positioned above the table 61 for vertical movement on guideposts 82, 84 and 86, being carried by a supporting structure 88 slidably mounted on the posts 82, 84 and 86. Means, not shown, are provided for moving the support 88 vertically to carry the applicators toward and away from the window 74. A greater or lesser number of applicators may be provided as required by the circumstances.

Figure 9:
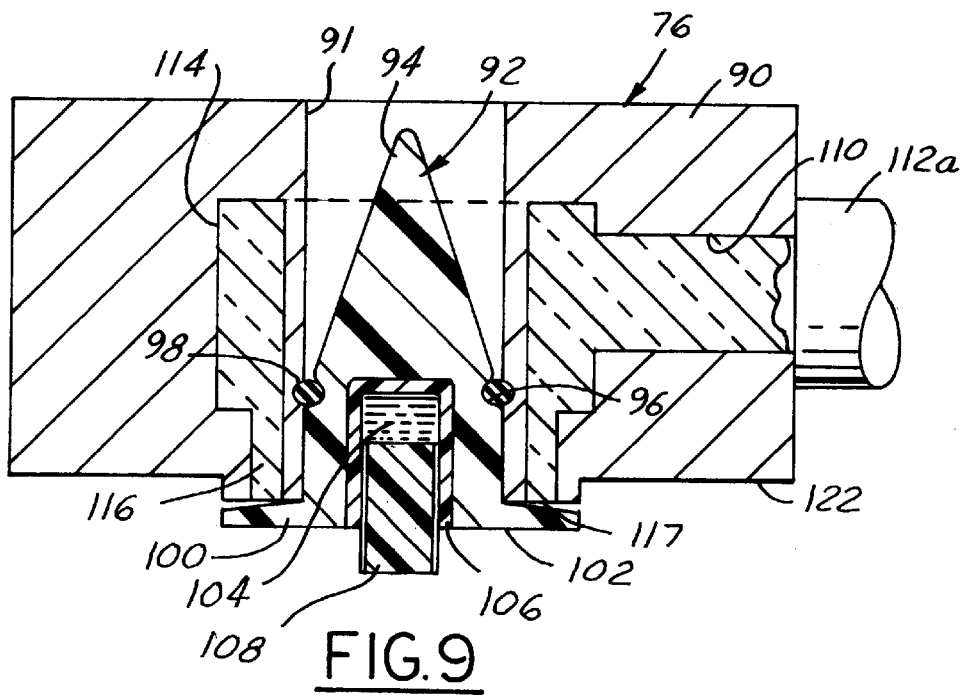
FIG. 9 shows a fastener held by an applicator prior to being pressed against an automobile window or other substrate.

Each applicator, as shown in FIG. 9, comprises a housing 90 having therein a fastener receiving chamber 91 within which a fastener is disposed for affixation to a window or a substrate in the jig 60. The fastener may have a cone-shaped end portion 94 to be received within locating holes or the like in the automobile body as previously described. The fastener may have a circumferential indentation 96 into which is snapped a spring retainer such as an O-ring retainer 98 mounted in the applicator for temporarily retaining the fastener in the applicator preparatory to adhering the fastener to the substrate or window 74. The fastener is provided with a UV transparent flange 100 which has a flat surface 102 for juxtaposing the substrate or window 74 when the applicator carries the fastener against the window.

In the embodiment shown in FIG. 9, the body of the fastener 92 is formed of a UV transparent material. To prevent the UV-curable adhesive 104 from curing prematurely, the adhesive is disposed within a cartridge 106, opaque to UV-curing radiation. The cartridge is closed by an opaque piston 108 similar to the arrangement previously described.

Figure 7:
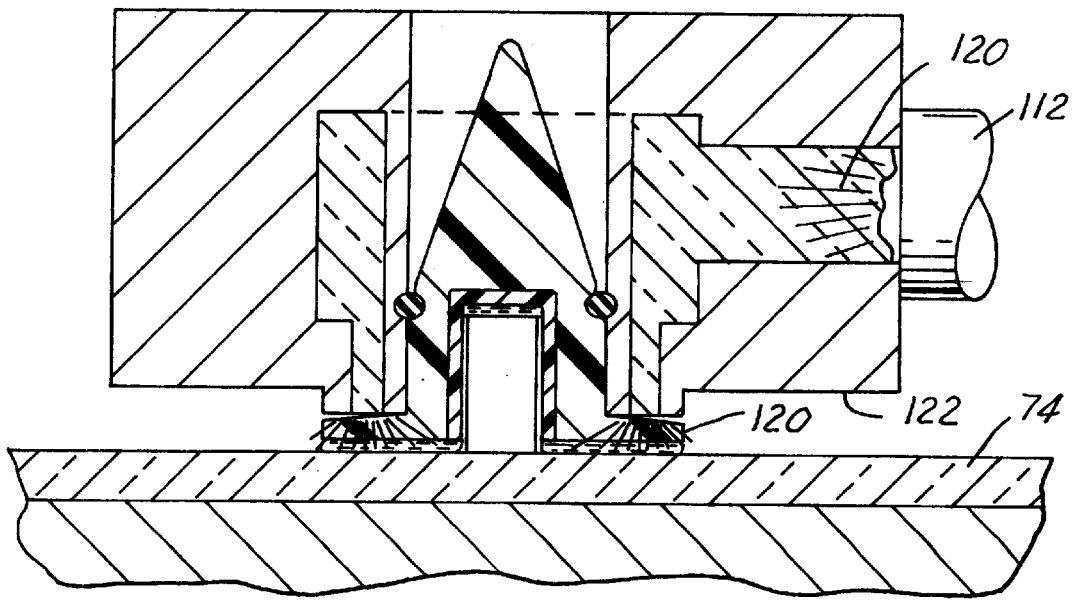
FIG. 7 is similar to FIG. 6 except the light source is creating the radiation at the fastener flange to cure the adhesive.

The housing 90 of each applicator is formed of a material opaque to the UV radiation which will cure the adhesive. Each applicator housing 90 is provided with a radial passageway 110 extending from a conductor such as the conductor 112a to an annular chamber 114 terminating in a focusing chamber 116. The conductor 112a may comprise a bundle of UV radiation-conducting fibers which extend through the passageway 110 and into the chambers 114 and 116 terminating in an annular radiation emitting end 117 at the lower end of chamber 116, i.e., at the face of the body 90 as best shown in FIG. 9. The annular emitting end of the conductive fibers, which terminate at the lower face 117 of the applicator, creates an annular beam of radiation directed against the transparent flange 100 as shown in FIG. 7.

Figure 6:
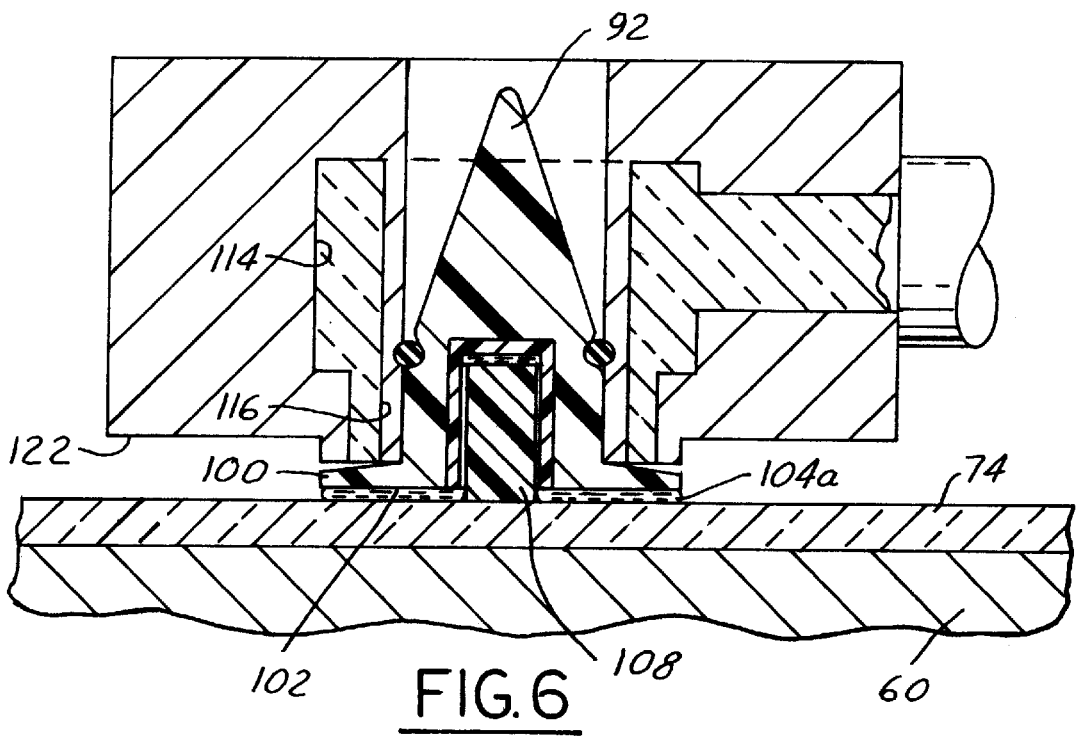
FIG. 6 is a cross-sectional view taken on the line 6—6 of FIG. 8 showing a fastener pressed by an applicator against the surface of a window with the UV-cured adhesive disposed between the flange of the fastener and the window.

Similar to the operation previously disclosed and described, when the applicator carries the fastener 92 against the substrate or window 74, as in FIG. 6, it causes the piston 108 to be displaced into the cartridge and the adhesive therein flows downwardly and radially outwardly between the bottom face 102 of the flange and the opposing surface of the substrate or window 74. The UV radiation which has entered the annular cavities 114 and 116 and directed at and through the transparent flange 100 causes a rapid curing of the adhesive in the interface between the flange and the substrate or window.

The conductors 112, 112a and 112b are connected to a source 118 of UV radiation schematically shown in FIG. 8. The conductors may comprise bundles of conductive fibers.

The construction and arrangement of the conductive fibers is such that an annular UV radiation beam is directed against the flange 100 of the fastener. The source 118 of the radiation is programmed to cause the radiation to pass through the conductors 112 to the associated applicator when the applicator has pressed the piston 108 into the cartridge as shown best in FIG. 7. In such figure, the radiation is depicted at 120. It will be noted that the face 122 of the applicator surrounds the fastener and provides an annular shield against escape of the radiation so that the radiation does not impinge on the eyes of personnel working at the apparatus. In a working model of the apparatus, the diameter of the applicator was on the order of three inches which provides somewhat more than one inch of overhang of the surface 122 circumjacent the fastener and the distance between the surface 122 and the window 74 approximately 0.10–0.14 millimeter and preferably 0.12 millimeter. This is a small enough gap to effectively shield the area beyond the applicator from UV radiation.

After the fastener has been adhered to the substrate or window 74, the applicator is raised vertically and the O-ring-like retainer 98 snaps out of the circumaxial groove 96 in the fastener releasing the fastener from the applicator. Other forms of temporary retention for the fastener will occur to those skilled in the art.

If desired, the apparatus schematically shown in FIG. 8, may be arranged adjacent are assembly line in an automobile assembly plant and the fasteners may be affixed to the windows just prior to the windows being installed in an automotive vehicle body passing down the assembly line. This is advantageous in that it avoids the problems associated with applying the fasteners at a remote location, then packaging the windows with the fasteners attached, in a suitable package so the fasteners are not knocked loose, and then shipping them to the automotive assembly plant. This is, of course, made possible by the quick curing of the UV-cured adhesive as taught herein.

It is also advantageous in certain circumstances to prime the frit coating 124 on the marginal edge of the window, as shown in FIG. 8 to improve adhesion of the fasteners. One percent (1 %) Vinyltrimethoxysilane in isopropanol has been found to be useful for this purpose. The following are sources for such adhesion enhancers:

Essex primer 435-18 termed BETASEAL® Glass Primer, manufactured by Essex Specialty Products, Inc., 1250 Harmon Road, Auburn Hills, Mich. 48326, now The Dow Chemical Company, Midland, Mich.

Ashland Primer #7780 termed GLASSGRIP, manufactured by Ashland Chemical Co., P.O. Box 2219, Columbus, Ohio.

Witco Primer, Silquest A-1100 silane manufactured by C.K. Witco Corp. of 199 Benson Road, Middlebury, Conn. 06749, having a chemical name: Gamma-Aminopropyltriethoxysilane.

OSI Specialties primer Silquest A-1120 silane manufactured by Compton Corp., 1 American Lane, Greenwich, Conn. 06831, having the chemical name: N-beta-(aminoethyl)-gamma-aminopropyltrimethoxysilane.

Such primers are applied to the frit coating and allowed to dry before the fasteners are attached to the primed area.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for affixing self-dispensing UV-curable adhesive fasteners to a substrate, comprising:
    an applicator for receiving a self-dispensing UV curable adhesive fastener and supporting the fastener to dispose a UV transparent flange thereof for pressing against a substrate on which the fastener is to be installed;
    said applicator moveable relative to a substrate to carry the UV transparent flange of a fastener supported by the applicator against the substrate and urge a projecting piston on the fastener into the fastener to displace UV curable adhesive in the fastener into an interface between the substrate and the transparent flange of the fastener; and
    a source of UV radiation on the applicator arranged to shine UV radiation against the transparent flange of a fastener supported by the applicator as the flange is pressed against a substrate when the fastener is applied thereto by the applicator.

2. The apparatus of claim 1 characterized in that said applicator includes a fastener retainer for engaging and releasably holding a fastener for application to a substrate.

3. The apparatus of claim 1 wherein the UV light source is arranged to shine an annular beam of UV light against the flange of a fastener pressed against a substrate by the applicator.

4. The apparatus of claim 1 wherein said applicator defines a UV light confining barrier surrounding a fastener supporting a UV curable fastener for essentially preventing escape of UV light from the applicator except that directed against the fastener flange.

5. The apparatus of claim 1 characterized in that said applicator has at one end a fastener receiving cavity for receiving a fastener to be attached to a substrate and fastener holders within the cavity for engaging a fastener received in the cavity and hold the fastener in preparation for affixing it to a substrate.

6. The apparatus of claim 1 wherein the applicator has an outwardly opening chamber for receiving a fastener to be affixed to a substrate, and a UV light source disposed in the chamber and arranged to focus UV light within the chamber against the flange of a fastener received in the chamber.

7. The invention defined by claims 1–6 wherein the substrate is a window to be installed in automotive vehicle bodies.

8. An apparatus for quickly affixing self-dispensing UV curable adhesive fasteners on windows to be installed in automotive vehicle bodies, comprising:
    a jig for receiving the window to be installed;
    a plurality of fastener applicators supported in relation to the jig for movement toward and from a window in the jig to affix fasteners thereto at predetermined locations;
    each applicator having an end portion defining a fastener receiving UV light confining chamber within which the fastener is disposed during affixation to a window in the jig;
    a fastener holder in each chamber for cooperating with a fastener in the chamber to releasably hold the fastener therein with a flange on the fastener positioned to abut a window in the jig when the applicator is moved to press the flange of a fastener in the chamber against the window; and
    a UV light source within said chamber to focus UV light on the flange of a fastener disposed in the chamber after the applicator presses and holds the flange against the window to cause dispensing of adhesive between the flange and the window.

* * * * *